(12) United States Patent
Liao

(10) Patent No.: US 10,917,128 B2
(45) Date of Patent: Feb. 9, 2021

(54) SIGNAL PROCESSING DEVICE

(71) Applicant: RichWave Technology Corp., Taipei (TW)

(72) Inventor: Lu-Hung Liao, Taipei (TW)

(73) Assignee: RichWave Technology Corp., Taipei (TW)

( * ) Notice: Subject to any disclaimer, the term of this patent is extended or adjusted under 35 U.S.C. 154(b) by 0 days.

(21) Appl. No.: 16/541,164

(22) Filed: Aug. 15, 2019

(65) Prior Publication Data
US 2020/0295791 A1    Sep. 17, 2020

(30) Foreign Application Priority Data
Mar. 11, 2019   (TW) .............................. 108108096 A

(51) Int. Cl.
*H03F 1/32* (2006.01)
*H04B 1/04* (2006.01)

(52) U.S. Cl.
CPC ......... *H04B 1/0483* (2013.01); *H04B 1/0458* (2013.01); *H04B 1/0475* (2013.01); *H04B 2001/0408* (2013.01)

(58) Field of Classification Search
CPC ........ H03F 1/32; H03F 1/3232; H03F 1/3241; H03F 1/3252; H03F 3/68; H04B 1/04; H04B 2001/0408; H04B 2001/0425; H04B 2001/0441

See application file for complete search history.

(56) References Cited

U.S. PATENT DOCUMENTS

| 6,573,793 | B1 | 6/2003 | Gutierrez | |
| 9,813,029 | B2 * | 11/2017 | Zhu ....................... | H04B 1/525 |
| 2003/0184373 | A1 | 10/2003 | Cameron et al. | |
| 2008/0231370 | A1 * | 9/2008 | Bretchko .............. | H03F 1/3223 330/278 |
| 2009/0072901 | A1 * | 3/2009 | Yamanouchi ......... | H03F 1/3223 330/149 |
| 2010/0259326 | A1 * | 10/2010 | Corman ................... | G06G 7/12 330/124 R |

FOREIGN PATENT DOCUMENTS

| CN | 103248393 | | 8/2013 | |
| JP | 3529439 | B2 * | 5/2004 | ............... H04B 1/04 |
| WO | 2018004402 | | 1/2018 | |

OTHER PUBLICATIONS

"Office Action of Taiwan Counterpart Application," dated Nov. 29, 2019, p. 1-p. 8.

* cited by examiner

*Primary Examiner* — Blane J Jackson
(74) *Attorney, Agent, or Firm* — JCIPRNET

(57) ABSTRACT

A signal processing device includes a signal input, a signal output, a first amplifier, a second amplifier, a first distortion adjustment circuit, and a second distortion adjustment circuit. The signal input receives a RF signal to be amplified. The signal output outputs an amplified RF signal. Each of the first and second amplifiers includes an input coupled to the signal input and an output coupled to the signal output. The first distortion adjustment circuit includes a connection coupled to the input of the first amplifier. The second distortion adjustment circuit includes a connection coupled to the input of the second amplifier. The number of transistors in the first amplifier is different from the number of transistors in the second amplifier.

20 Claims, 6 Drawing Sheets

SIGNAL PROCESSING DEVICE

CROSS-REFERENCE TO RELATED APPLICATION

This application claims the priority benefit of Taiwan application serial no. 108108096, filed on Mar. 11, 2019. The entirety of the above-mentioned patent application is hereby incorporated by reference herein and made a part of this specification.

TECHNICAL FIELD

The disclosure relates to a signal processing technology, and in particular to a signal processing device that may suppress intermodulation distortions.

BACKGROUND

In the telecommunication technology, the efficiency of signal transmission is usually increased by adjusting signals. However, it is impossible for electronic circuits or amplifiers to achieve a completely ideal linearity; therefore, during the process of signal intermodulation, the situation of intermodulation distortions may occur.

For example, when a signal is transmitted into an amplifier to be amplified, under a nonlinear effect, each signal with different frequencies may generate additional signals which the original signals do not have, and these additional signals would inevitably affect the following signal processing. Therefore, it is imaginable that, when the input signal is a complex multi-frequency signal, the additional signals generated by intermodulation distortions may interfere the telecommunication system. Therefore, how to eliminate, filter out, or suppress these unnecessary additional signals is one of the problems desired to be solved.

SUMMARY

A signal processing device of the disclosure includes a signal input, a signal output, a first amplifier, a second amplifier, a first distortion adjustment circuit, and a second distortion adjustment circuit. The signal input is used to receive a radio frequency signal to be amplified. The signal output is used to output the amplified radio frequency signal. The first amplifier includes a first input coupled to the signal input and a first output coupled to the signal output. The second amplifier includes a second input coupled to the signal input and a second output coupled to the signal output. The first distortion adjustment circuit includes a first connection coupled to the first input of the first amplifier. The second distortion adjustment circuit includes a second connection coupled to the second input of the second amplifier. The number of transistors in the first amplifier is different from the number of transistors in the second amplifier. The first distortion adjustment circuit is used to make the radio frequency signal amplified by the first amplifier possess a first intermodulation distortion, and the second distortion adjustment circuit is used to make the radio frequency signal amplified by the second amplifier possess a second intermodulation distortion, and the first and second intermodulation distortions are at least partially complementary and opposite to each other.

In order to make the features and advantages of the disclosure mentioned above more understandable, embodiments will be described in detail below with reference to the accompanying drawings.

DESCRIPTION OF THE EMBODIMENTS

Figure 1A:
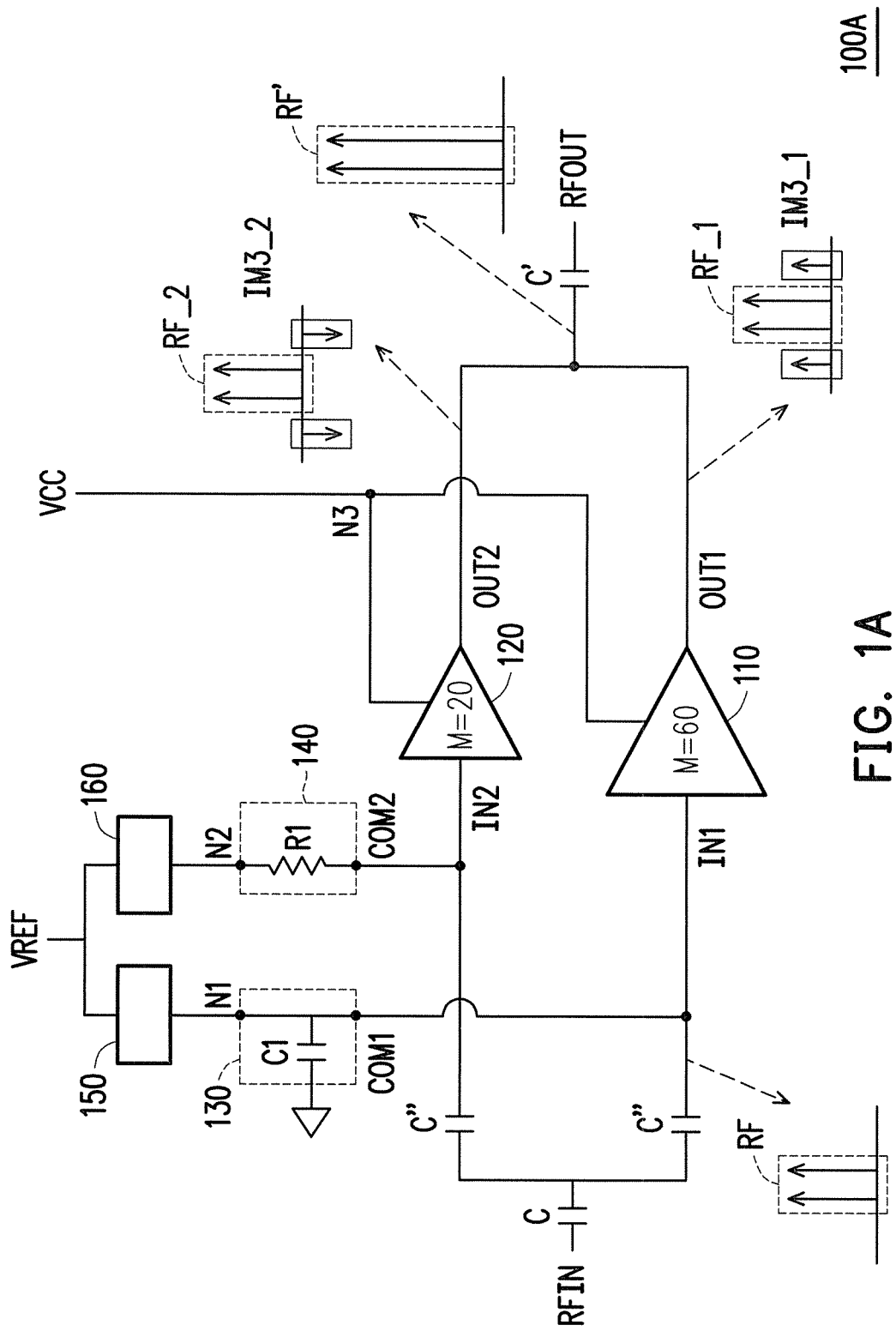
FIG. 1A is a circuit diagram of a signal processing device according to an embodiment of the disclosure.

FIG. 1A is a circuit diagram of a signal processing device according to an embodiment of the disclosure. Please refer to FIG. 1A, a signal processing device 100A includes a signal input RFIN, a signal output RFOUT, an amplifier 110, an amplifier 120, a distortion adjustment circuit 130 and a distortion adjustment circuit 140.

The amplifier 110 includes an input IN1 coupled to the signal input RFIN and an output OUT1 coupled to the signal output RFOUT; the amplifier 120 includes an input IN2 coupled to the signal input RFIN and an output OUT2 coupled to the signal output RFOUT. The distortion adjustment circuit 130 includes a connection COM1 coupled to the input IN1 of the amplifier 110; the distortion adjustment circuit 140 includes a connection COM2 coupled to the input IN2 of the amplifier 120.

In the embodiment of the disclosure, the signal input RFIN receives a radio frequency signal RF to be amplified, and the signal output RFOUT outputs the amplified frequency signal RF'. In an embodiment, the distortion adjustment circuit 130 and the distortion adjustment circuit 140 are used to suppress the intermodulation distortion possessed by the radio frequency signal RF amplified by the amplifiers 110 and 120 to the signal output RFOUT.

Specifically, in the embodiment of the disclosure, the number of transistors in the amplifier 110 is different from the number of transistors in the amplifier 120. That is, the number of transistors in the amplifier 110 is X, the number of transistors in the amplifier 120 is Y, and X is different from Y. In one embodiment, there are X/Y transistors coupled in parallel for amplifying the radio frequency signal RF with X/Y parallel-amplifying paths in the amplifier 110/120. In another embodiment, there are X/Y emitter fingers of transistors coupled in parallel for amplifying the radio frequency signal RF with X/Y parallel-amplifying paths in the amplifier 110/120. In detail, the emitter areas of transistors coupled in parallel in the amplifier 110/120 is AX/AY, and the emitter areas AX/AY is in proportion to X/Y, so the emitter areas AX and AY are different. In other words, the sizes of the amplifier 110 and the amplifier 120 are different. For example, the transistor in the amplifier 110 or 120 for amplifying the radio frequency signal could have a first end for outputting the amplified radio frequency signal, a second end for receiving a reference voltage, and a control end for receiving the radio frequency signal. In one embodiment, the transistor is a BJT (bipolar junction transistor), the first end could be an emitter, the second end could be a collector, and the control end could be a base. In another embodiment, the transistor is a FET (field effect transistor), the first end could be a source, the second end could be a drain, and the control end could be a gate. The radio frequency signal RF amplified by the amplifier 110 possesses a main signal RF_1 and an intermodulation distortion IM3_1, and the radio frequency signal RF amplified by the amplifier 120 possesses a main signal RF_2 and an intermodulation distortion IM3_2. Through adjusting numerical values of each element in the distortion adjustment circuits 130 and 140 when performing the circuit design, the intermodulation distortion IM3_1 and the intermodulation distortion IM3_2 may be at least partially complementary and opposite to each other.

The intermodulation distortion IM3_1 and intermodulation distortion IM3_2 shall be further explained herein. In an embodiment, the distortion adjustment circuit 130 is used to make the intermodulation distortion IM3_1 possessed by the radio frequency signal RF amplified by the amplifier 110 has a first phase offset; the distortion adjustment circuit 140 is used to make the intermodulation distortion IM3_2 possessed by the radio frequency signal RF amplified by the amplifier 120 has a second phase offset. The present embodiment makes a part of the first phase offset and a part of the second phase offset opposite to and cancel out each other through adjusting the numerical values of each element in the distortion adjustment circuits 130 and 140. For example, as shown by FIG. 1A, the phase of the intermodulation distortion IM3_1 differs from the phase of the intermodulation distortion IM3_2 by 180 degrees, and the phase offset of the intermodulation distortion IM3_1 equals to the phase offset of the intermodulation distortion IM3_2. Therefore, the intermodulation distortions IM3_1 and IM3_2 are able to cancel out each other and output the more accurate and amplified radio frequency signal RF' (the amplified radio frequency signal RF' is the main signal RF_1 plus the main signal RF_2) to increase the performance of the whole system. However, the phase offsets of the intermodulation distortion IM3_1 and IM3_2 are exactly opposite to and cancel out each other. If just a part in the phase offset of the intermodulation distortion IM3_1 can be opposite to and cancel out a part in the phase offset of the intermodulation distortion IM3_2, the overall intermodulation distortion of the signal processing device 100A may be suppressed. The disclosure does not limit the feature hereto. In an embodiment, the number of the transistors in the amplifier 110 is more than the number of the transistors in the amplifier 120. To reduce the influence of the intermodulation distortion to the overall radio frequency signal amplifying quality (such as linearity) of the signal processing device 100A, the first phase offset (such as 100 degrees) caused by the distortion adjustment circuit 130 may be smaller than the second phase offset (such as 280 degrees) caused by the distortion adjustment circuit 140, making a larger number of the transistors correspond to the smaller phase offset.

In an embodiment, the signal processing device 100A further includes DC blocking capacitors C and C' to avoid a direct current signal from easily transmitting on the circuit between the signal input RFIN and the signal output RFOUT of the signal processing device 100A. Specifically, a first end of the DC blocking capacitor C is coupled to the signal input RFIN, and a second end of the DC blocking capacitor C is coupled to the input IN1 of the amplifier 110 and the input IN2 of the amplifier 120. A first end of the DC blocking capacitor C' is coupled to the output OUT1 of the amplifier 110 and the output OUT2 of the amplifier 120, and a second end of the DC blocking capacitor C' is coupled to the signal output RFOUT.

It is worth noting that, in an embodiment, the intermodulation distortion IM3_1 and the intermodulation distortion IM3_2 are third order intermodulation distortions. However, the disclosure does not limit the feature hereto. In addition, in an embodiment, the power nodes N3 of the amplifiers 110 and 120 are coupled to the power voltage source VCC to drive the amplifiers 110 and 120 to amplify the radio frequency signal RF. Moreover, in an embodiment, the ratio of the number of transistors in the amplifier 110 to the number of transistors in the amplifier 120 is 3:1. For example, the number of transistors in the amplifier 110 in FIG. 1A is 60 (M=60), and the number of transistors in the amplifier 120 is 20 (M=20). In another embodiment, the ratio of the number of transistors in the amplifier 110 to the number of transistors in the amplifier 120 is 2:1, which means that the ratio of the number of transistors in the amplifier 110 to the number of transistors in the amplifier 120 is, for example, 2-3. However, the disclosure does not limit the ratio and the number of transistors in the amplifier 110 and the amplifier 120. Besides, in an embodiment, the signal output RFOUT may be connected to a rear end switch and a rear end antenna as a part of the output circuit of the radio frequency signal.

In an embodiment, the signal processing device 100A further includes bias circuits 150 and 160. The bias circuit 150 is coupled to the amplifier 110 through the distortion adjustment circuit 130, and the bias circuit 160 is coupled to the amplifier 120 through the distortion adjustment circuit 140. The bias circuits 150 and 160 are respectively used to make the amplifiers 110 and 120 biased at the same class. For example, the amplifiers 110 and 120 are both biased at class A or class B instead of class C.

The detailed circuit structures of the distortion adjustment circuits 130 and 140 shall be further elaborated herein. In an embodiment, the distortion adjustment circuit 130 includes a capacitor C1. A first end of the capacitor C1 is coupled to a node N1 and the connection COM1, and a second end of the capacitor C1 is coupled to a reference potential terminal. Besides, the distortion adjustment circuit 140 includes a resistor R1. A first end of the resistor R1 is coupled to the connection COM2, and a second end of the resistor R1 is coupled to a node N2. In an embodiment, the reference potential terminal is, for example, used to receive ground voltage. However, the disclosure does not limit the feature hereto.

Specifically, in an embodiment, first ends of the bias circuits 150 and 160 are both coupled to a reference voltage source VREF. A second end of the bias circuit 150 is coupled to the node N1, and a second end of the bias voltage 160 is coupled to the node N2, making the signal processing device 100A capable of correspondingly adjusting the intermodulation distortions IM3_1 and IM3_2 through adjusting the capacitance value of the capacitor C1 and the resistance value of the resistor R1 during design, so as to suppress the intermodulation distortion possessed by the radio frequency signal RF amplified by the amplifiers 110 and 120 to the signal output RFOUT.

Figure 1B:
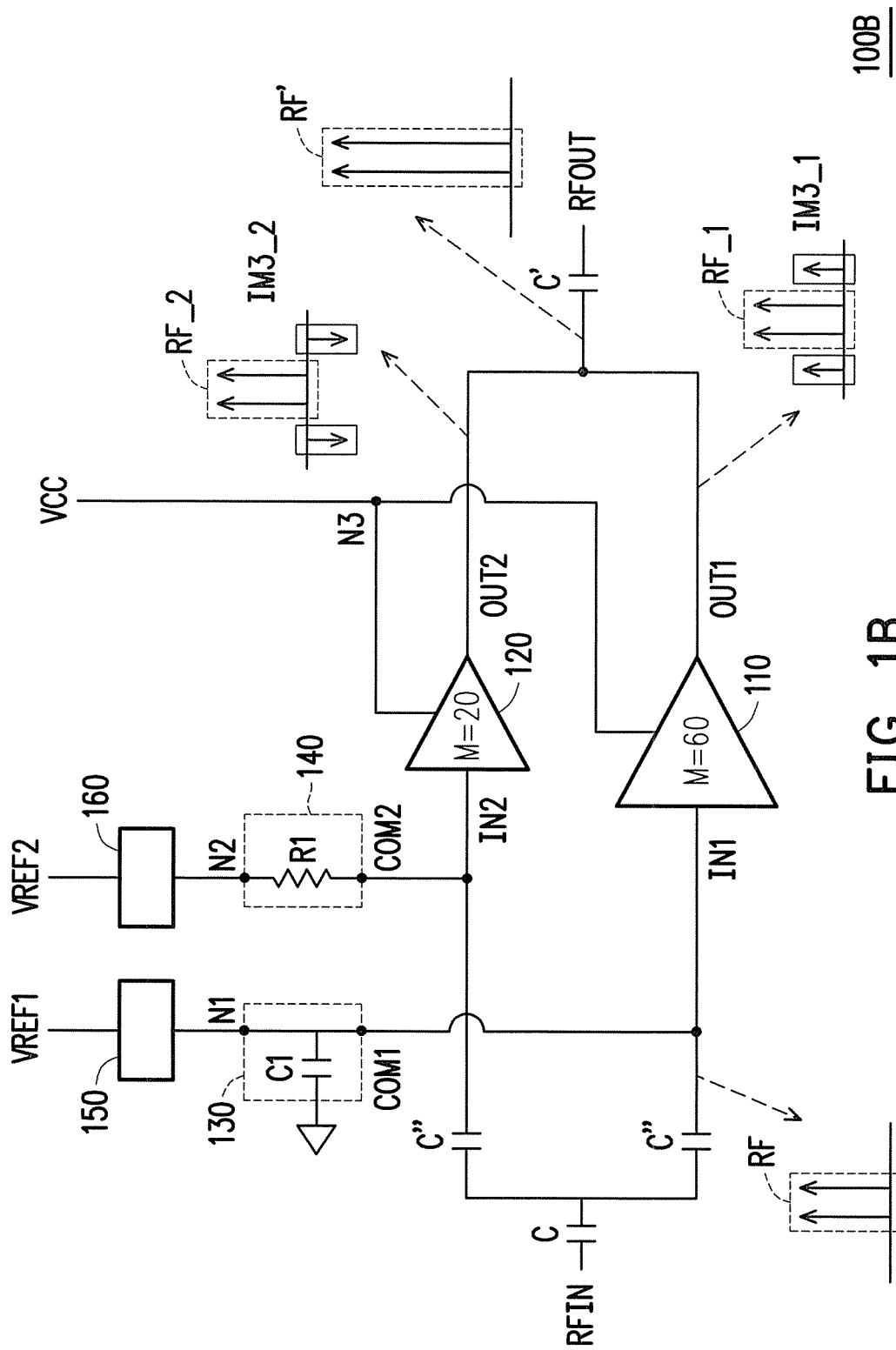
FIG. 1B is a circuit diagram of a signal processing device according to another embodiment of the disclosure.

FIG. 1B is a circuit diagram of a signal processing device according to another embodiment of the disclosure. Please refer to FIG. 1B, the signal processing device 100B of FIG. 1B is similar to the signal processing device 100 A of the FIG. 1A. The difference of the two devices mainly lies in that the bias circuit 150 is coupled to a reference voltage source VREF1, and the bias circuit 160 is coupled to a reference voltage source VREF2, and the voltage value of the reference voltage source VREF1 is different from the voltage value of the reference voltage source VREF2.

In the present embodiment, during the design stage of the signal processing device 100B, the signal processing device 100B suppresses the intermodulation distortion through adjusting the voltage value of the reference voltage source VREF1 and the voltage value of the reference voltage source VREF2. In other words, in the design stage of the signal processing device 100B, apart from the method of adjusting the numerical values of each element in the distortion adjustment circuits 130 and 140, the intermodulation distortions IM3_1 and IM3_2 may be adjusted correspondingly through the method of solely applying or combining the present embodiment to adjust the voltage value of the reference voltage source VREF1 and the voltage value of the reference voltage source VREF2 to suppress the intermodulation distortion possessed by the radio frequency RF amplified by the amplifiers 110 and 120 to the signal output RFOUT.

Figure 2:
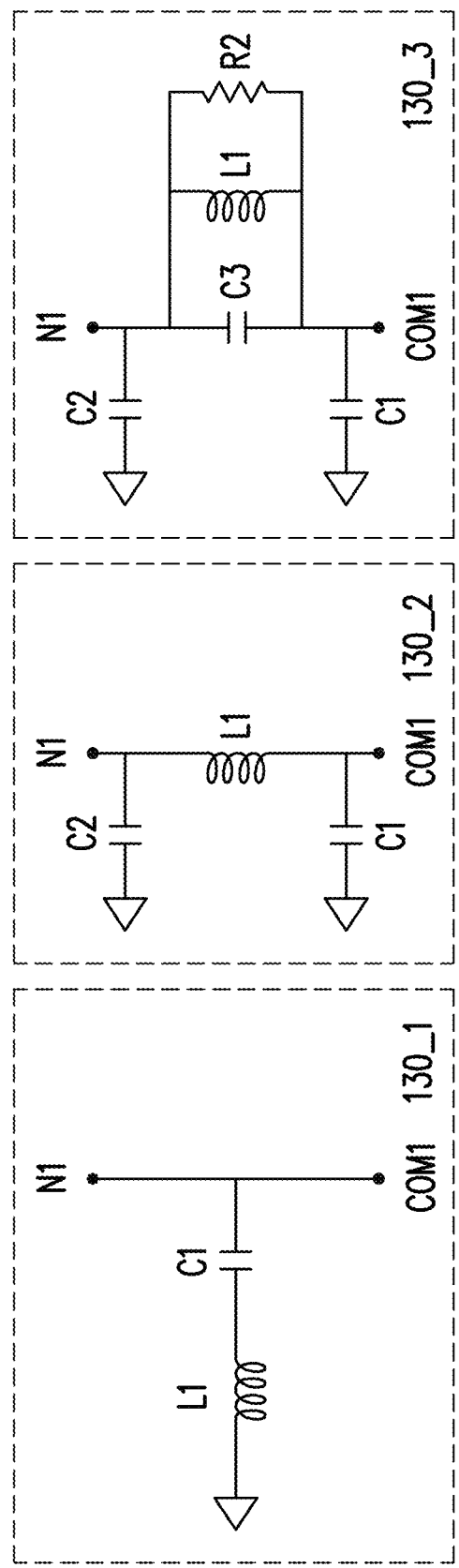
FIG. 2 is a circuit diagram of a plurality of implementation methods of the distortion adjustment circuit 130 according to embodiments of the disclosure.

FIG. 2 is a circuit diagram of a plurality of implementation methods of the distortion adjustment circuit 130 according embodiments of the disclosure. The distortion adjustment circuits 130 in FIG. 1A and FIG. 1B may be implemented by any of a distortion adjustment circuit 130_1, 130_2 and 130_3 in FIG. 2. Persons who apply the present embodiment may design other types of resistor-inductor-capacitor (R-L-C) circuit to implement the distortion adjustment circuit 130, and the embodiment of the disclosure does not limit the feature hereto.

Please refer to FIG. 2. In an embodiment, the distortion adjustment circuit 130_1 includes the capacitor C1 and the inductor L. The first end of the capacitor C1 is coupled to the node N1 and the connection COM1, and the second end of the capacitor C1 is coupled to the reference potential terminal through the inductor L. In an embodiment, the reference potential terminal is, for example, used to receive ground voltage. However, the disclosure does not limit the feature hereto.

In another embodiment, the distortion adjustment circuit 130_2 includes the capacitors C1, C2 and the inductor L. The first end of the capacitor C1 is coupled to a first end of the inductor L1, and a first end of the capacitor C2 is coupled to a second end of the inductor L1, and second ends of the capacitors C1 and C2 are both coupled to the reference potential terminal. The first end of the inductor L1 is coupled to the connection COM1, and the second end of the inductor L1 is coupled to the node N1. In an embodiment, the reference potential terminal is, for example, used to receive a ground voltage. However, the disclosure does not limit the feature hereto.

In another embodiment, the distortion adjustment circuit 130_3 is similar to the distortion adjustment circuit 130_2, and the difference of the two mainly lies in that the distortion adjustment circuit 130_3 further includes a capacitor C3 and a resistor R2. A first end of the resistor R2 is coupled to the first end of the capacitor C1, and a second end of the resistor R2 is coupled to the first end of the capacitor C2. Also, a first end of a the capacitor C3 is coupled to the first end of the capacitor C1, and a second end of the capacitor C3 is coupled to the first end of the capacitor C2.

Figure 3:
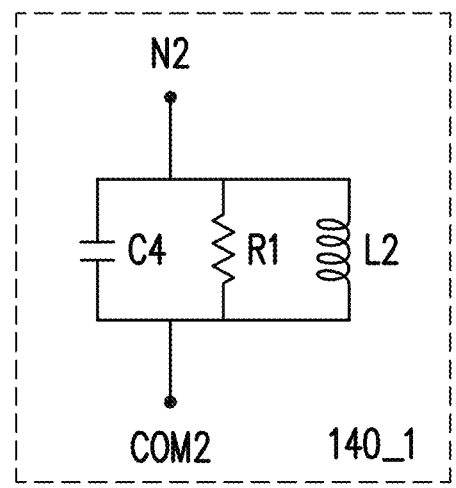
FIG. 3 is a circuit diagram of a plurality of implementation methods of the distortion adjustment circuit 140 according to embodiments of the disclosure.

FIG. 3 is a circuit diagram of a plurality of implementation methods of the distortion adjustment circuit 140 according to embodiments of the disclosure. The distortion adjustment circuit 140 in FIG. 1A and FIG. 1B may be implemented by, for example, a distortion adjustment circuit 140_1 in FIG. 3. Persons who apply the present embodiment may design other types of resistor-inductor-capacitor (R-L-C) circuit to implement the distortion adjustment circuit 140, and the embodiment of the disclosure does not limit the feature hereto.

Please refer to FIG. 3. In an embodiment, the distortion adjustment circuit 140_1 includes the resistor R1, an inductor L2, and a capacitor C4. The first end of the resistor R1 is coupled to the connection COM2, and the second end of the resistor R1 is coupled to the node N2. A first end of the inductor L2 is coupled to the first end of the resistor R1, and a second end of the inductor L2 is coupled to the second end of the resistor R1; also, a first end of the capacitor C4 is coupled to the first end of the resistor R1 and a second end of the capacitor C4 is coupled to the second end of the resistor R1.

Figure 4:
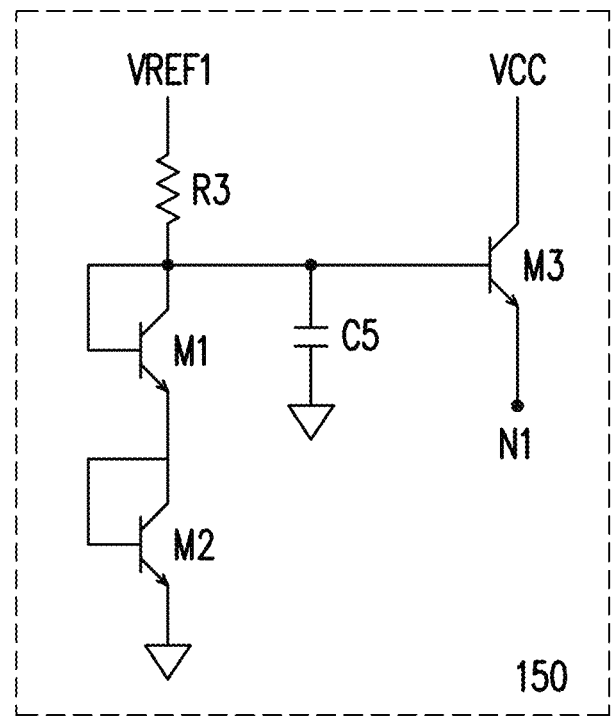
FIG. 4 is a circuit diagram of the bias circuit 150 according to an embodiment of the disclosure.

The bias circuits 150 and 160 in FIG. 1A and FIG. 1B may be implemented by the same circuit structure, and a circuit is provided hereto as the bias circuit 150 as an example. FIG. 4 is a circuit diagram of the bias circuit 150 according to an embodiment of the disclosure. The bias circuit 150 in FIG. 1A and FIG. 1B may, for example, be the bias circuit in FIG. 4. Persons who apply the present embodiment may adopt other circuit structures to implement the bias circuits 150 and 160, and the disclosure does not limit the feature hereto.

Please refer to FIG. 4. In the present embodiment, the bias circuit 150 includes transistors M1, M2, M3, a resistor R3 and a capacitor C5. A first end of the transistor M1 is coupled to a second end and a control end of the transistor M2; a second end of the transistor M1 is coupled to a control end of the transistor M1, a first end of the resistor R3, a first end of the capacitor C5 and a control end of the transistor M3; a second end of the resistor R3 is coupled to the reference voltage source VREF1; a first end of the transistor M2 and a second end of the capacitor C5 are coupled to the reference potential terminal; a second end of the transistor M3 is coupled to the power voltage source VCC; a first end of the transistor M3 is coupled to the node N1. In an embodiment, the reference potential terminal is, for example, used to receive ground voltage. However, the disclosure does not limit the feature hereto. In some embodiments, the transistors M1 to M3 are, for example, P-type Metal Oxide Semiconductor (PMOS) transistor, N-type Metal Oxide Semiconductor (NMOS) transistor or bipolar junction transistor (BJT), and the disclosure does not limit the feature hereto.

It is worth noting that, in an embodiment, the circuit structure of the bias circuit 160 is similar to the circuit structure of the bias circuit 150, and the difference of the two mainly lies in that the a second end of the resistor R3 in the bias circuit 160 is coupled to the reference voltage source VREF2.

Figure 5:
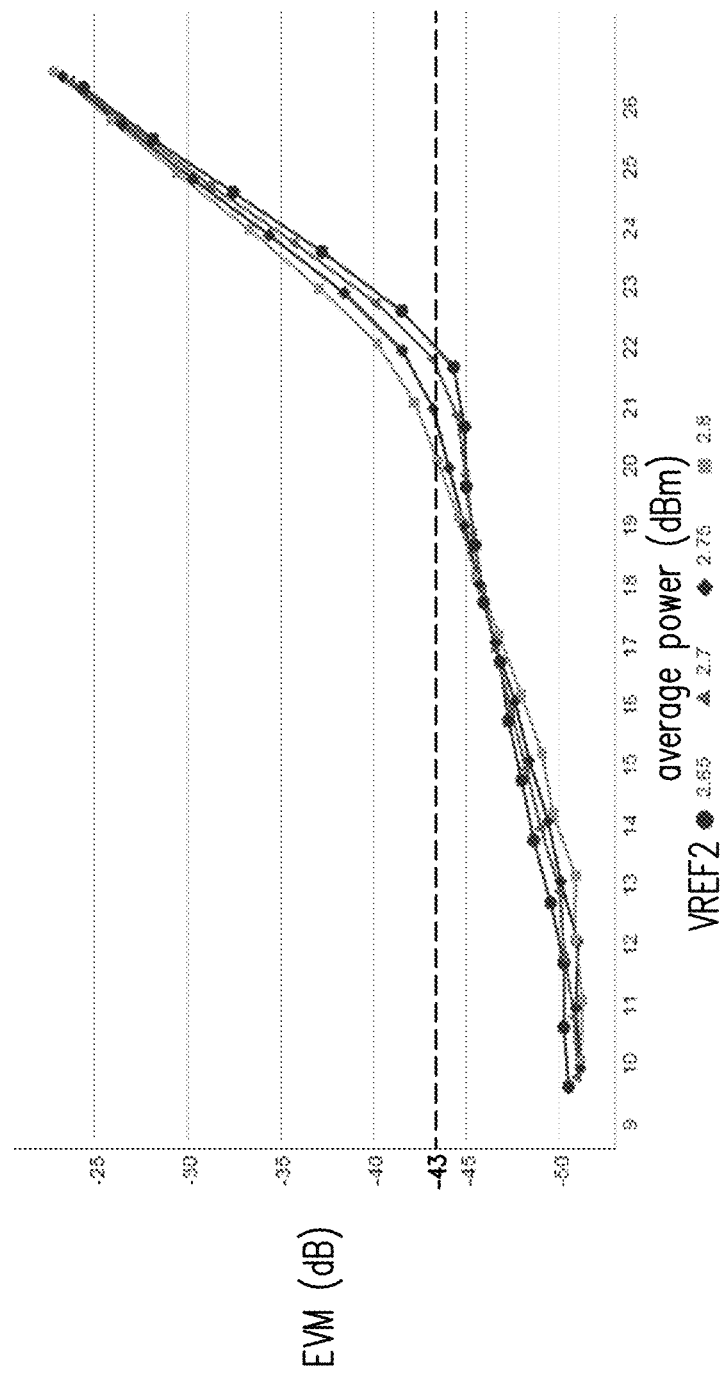
FIG. 5 and FIG. 6 are curve diagrams of the signal processing device 100B improving an intermodulation distortion according to an embodiment of the disclosure.
Figure 6:
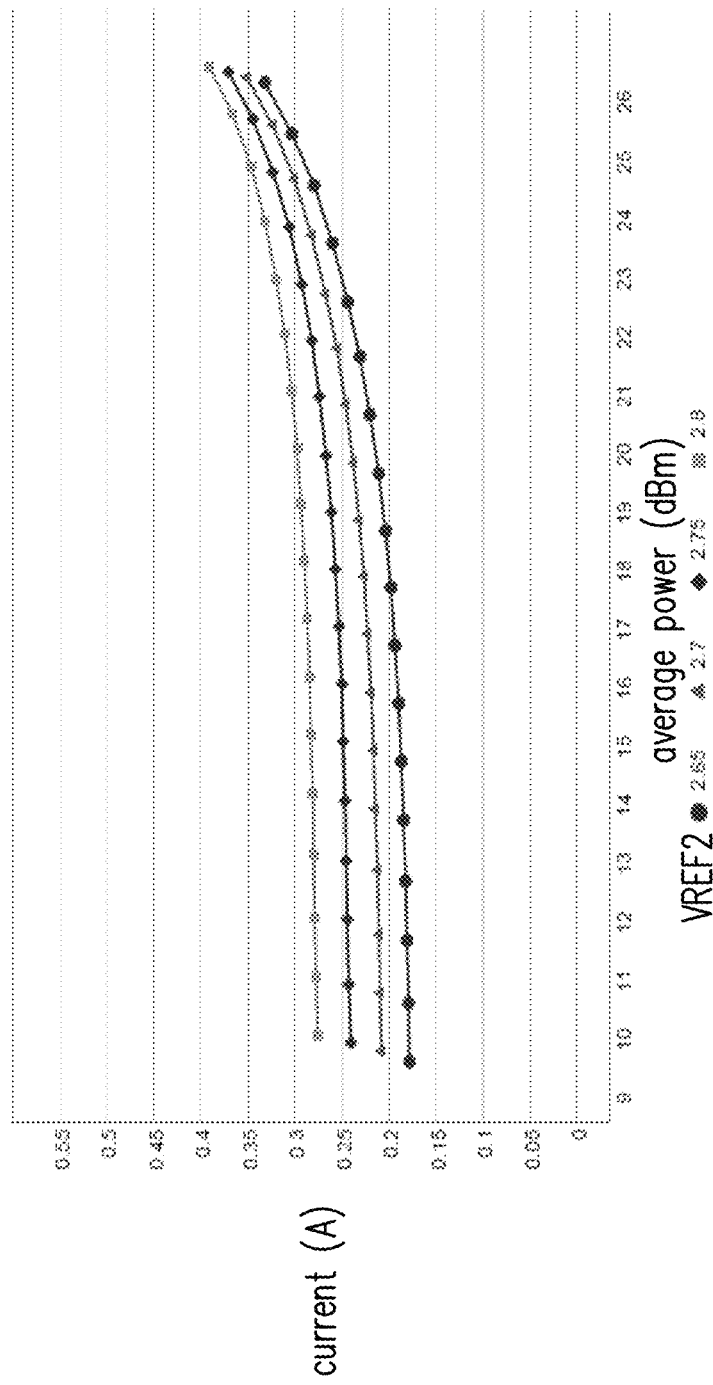

FIG. 5 and FIG. 6 are curve diagrams of the signal processing device 100B improving an intermodulation distortion according to an embodiment of the disclosure.

Please refer to FIG. 1B and FIG. 5. FIG. 5 is a curve diagram with four curves showing that that a bias circuit 150 in the signal processing device 100B is coupled to the reference voltage source VREF1 having the same voltage value, and the bias circuit 160 is coupled to a reference voltage source VREF2 having different voltage values. Specifically, the voltage value of the voltage source VREF1 is fixed as 2.8V, and the voltage values of the reference voltage source VREF2 are adjusted in sequence (the voltage values of the reference voltage source VREF2 are adjusted as 2.8V, 2.75V, 2.7V and 2.65V). Through the adjustment to the voltage value of the reference voltage source VREF2, the signal processing device 100B may greatly reduce the influence of the intermodulation distortion (IM3) under specific situation (such as −43 ab). Meanwhile, please refer to FIG. 6. The signal processing device 100B may reduce the current flowing through the distortion adjustment circuit 130 and the distortion adjustment circuit 140, so as to save the power consumption.

Summing up, the signal processing device provided by the embodiments of the disclosure is disposed with two amplifiers with different numbers of transistors as amplifiers with different sizes, and the radio frequency signals received by the signal input through the signal processing device are amplified respectively by the two amplifiers. Since the radio frequency signals amplified respectively by the two amplifiers both possess intermodulation distortions, the present embodiment designs the distortion adjustment circuits corresponding to the two amplifiers, making the intermodulation distortions generated by radio frequency signal amplified by the two amplifiers to the signal output possess opposite phases as likely as possible, which means making the phases of the two intermodulation distortions as phase offsets opposite to each other to cancel out each other. Therefore, the signal processing device may output and receive a signal with less noise, reduce the filtration of noise (such as intermodulation distortion), and increase the performance of the entire system to signal processing. Besides, through experiments, the signal processing device of the embodiments of the disclosure is proved to be able to not only reduce the influence of intermodulation distortions under specific situation but save power consumptions at the same time.

Although the disclosure has been disclosed in the above embodiments, the embodiments are not intended to limit the disclosure, and those skilled in the art may make some modifications and refinements without departing from the spirit and scope of the disclosure. Therefore, the scope of the disclosure is defined by the claims attached below.

What is claimed is:

1. A signal processing device comprising:
   a signal input, used to receive a radio frequency signal to be amplified;
   a signal output, used to output an amplified radio signal;
   a first amplifier, comprising a first input coupled to the signal input and a first output coupled to the signal output;
   a second amplifier, comprising a second input coupled to the signal input and a second output coupled to the signal output;
   a first distortion compensation circuit, comprising a first connection coupled to the first input of the first amplifier; and
   a second distortion compensation circuit, comprising a second connection coupled to the second input of the second amplifier,
   wherein the number of transistors used for signal amplification and connected in parallel in the first amplifier is different from the number of transistors used for signal amplification and connected in parallel in the second amplifier,
   wherein the first distortion compensation circuit is used to make the radio frequency signal amplified by the first amplifier possess a first intermodulation distortion, and the second distortion compensation circuit is used to make the radio frequency signal amplified by the second amplifier possess a second intermodulation distortion, and the first and second intermodulation distortions are at least partially complementary and opposite to each other.

2. The signal processing device according to claim 1, wherein the first distortion compensation circuit is used to make the first intermodulation distortion possess a first phase offset; the second distortion compensation circuit is used to make the second intermodulation distortion possess a second phase offset, and a part of the first phase offset and a part of the second phase offset are opposite to and cancel out each other.

3. The signal processing device according to claim 1, wherein the first intermodulation distortion and the second intermodulation distortion are third order distortions.

4. The signal processing device according to claim 1, further comprising:
   a first bias circuit coupled to the first amplifier; and
   a second bias circuit coupled to the second amplifier,
   wherein the first bias circuit and the second bias circuit are respectively used to make the first amplifier and the second amplifier biased at the same class.

5. The signal processing device according to claim 1, wherein the first distortion compensation circuit and the second distortion compensation circuit are used to suppress intermodulation distortions possessed by the radio frequency signal amplified by the first amplifier and the second amplifier to the signal output.

6. The signal processing device according to claim 5, wherein the first distortion compensation circuit comprises a first capacitor, a first end of the first capacitor is coupled to the first connection, and a second end of the first capacitor is coupled to a reference potential terminal, and
   the second distortion compensation circuit comprises a first resistor, and a first end of the first resistor is coupled to the second connection.

7. The signal processing device according to claim 6, further comprising:
   a first bias circuit, coupled to a reference voltage source; and
   a second bias circuit, coupled to the reference voltage source,
   wherein the first capacitor and the first resistor are used to suppress the intermodulation distortions.

8. The signal processing device according to claim 6, wherein the first distortion compensation circuit further comprises:
   a first inductor, wherein the second end of the first capacitor is coupled to the reference potential terminal through the first inductor.

9. The signal processing device according to claim 6, wherein the first distortion compensation circuit further comprises:
   a first inductor, wherein the first end of the first capacitor is coupled to a first end of the first inductor; and
   a second capacitor, wherein a first end of the second capacitor is coupled to a second end of the first inductor, and a second end of the second capacitor is coupled to the reference potential terminal.

10. The signal processing device according to claim 9, wherein the first distortion compensation circuit further comprises:
    a second resistor, wherein a first end of the second resistor is coupled to the first end of the first capacitor, and a second end of the second resistor is coupled to the first end of the second capacitor; and
    a third capacitor, wherein a first end of the third capacitor is coupled to the first end of the first capacitor, and a second end of the third capacitor is coupled to the first end of the second capacitor.

11. The signal processing device according to claim 6, wherein the second distortion compensation circuit further comprises:
- a second inductor, wherein a first end of the second inductor is coupled to the first end of the first resistor, and a second end of the second inductor is coupled to a second end of the first resistor; and
- a fourth capacitor, wherein a first end of the fourth capacitor is coupled to the first end of the first resistor, and a second end of the fourth capacitor is coupled to the second end of the first resistor.

12. The signal processing device according to claim 5, further comprising:
- a first bias circuit, configured to couple to a first reference voltage source; and
- a second bias circuit, configured to couple to a second reference voltage source,
- wherein a first voltage value of the first reference voltage source is different from a second voltage value of the second reference voltage source, and a voltage difference between the first reference voltage source and the second reference voltage source is used to suppress the intermodulation distortions.

13. The signal processing device according to claim 1, wherein power ends of the first amplifier and the second amplifier are configured to couple to a power voltage source.

14. The signal processing device according to claim 1, wherein the number of transistors in the first amplifier is more than the number of transistors in the second amplifier, and the first distortion compensation circuit is used to make the first intermodulation distortion possess a first phase offset, and the second distortion compensation circuit is used to make the second intermodulation distortion possess a second phase offset, and the first phase offset is smaller than the second phase offset.

15. The signal processing device according to claim 1, wherein a ratio of the number of transistors in the first amplifier to the number of transistors in the second amplifier is 2 to 3.

16. The signal processing device according to claim 1, wherein the number of transistors in the first amplifier is X, the number of transistors in the second amplifier is Y, the X transistors in the first amplifier amplify the radio frequency signal, and the Y transistors in the second amplifier amplify the radio frequency signal.

17. The signal processing device according to claim 1, wherein a number of emitter fingers of the transistors for amplifying the radio frequency signal in the first amplifier is X, a number of emitter fingers of transistors for amplifying the radio frequency signal in the second amplifier is Y, and X is different from Y.

18. The signal processing device according to claim 17, wherein a size of emitter areas of the transistors for amplifying the radio frequency signal in the first amplifier is AX, a size of emitter area of transistors for amplifying the radio frequency signal in the second amplifier is AY, X is in proportion to AX, and Y is in proportion to AY.

19. The signal processing device according to claim 1, wherein a size the first amplifier is X, a size of the second amplifier is Y, and X is different from Y.

20. The signal processing device according to claim 1, wherein a number of paths for amplifying the radio frequency signal in the first amplifier is X, a number of paths for amplifying the radio frequency signal in the second amplifier is Y, and X is different from Y.

* * * * *